Nov. 14, 1967   W. R. KNAPP   3,352,658
METHOD OF FORMING CHARGES OF MOLTEN GLASS
Filed April 13, 1964

INVENTOR.
Warren R. Knapp
BY Clarence R. Patty
ATTORNEY

United States Patent Office 3,352,658
Patented Nov. 14, 1967

3,352,658
METHOD OF FORMING CHARGES OF MOLTEN GLASS
Warren R. Knapp, Addison, N.Y., assignor to Corning Glass Works, Corning, N.Y., a corporation of New York
Filed Apr. 13, 1964, Ser. No. 359,237
10 Claims. (Cl. 65—70)

ABSTRACT OF THE DISCLOSURE

A continuous stream of low viscosity molten glass is fed across the tops of a series of upwardly open molds. The stream is maintained over the molds for a time sufficient to cause the stream to be drawn down solely under the influence of gravity so as to be severed by the edges of the molds to form charges in the molds.

---

This invention relates to methods for forming charges of molten glass.

Conventional methods for forming charges of molten glass and for depositing the charges in molds involve generally providing molten glass within the viscosity range approximately 600–700 poises, severing the glass from its source by means of shears to form gobs and allowing the severed gobs to drop into the molds. Due to the fact that glass at viscosities suitable for shearing flows slowly, and due to the mechanical limitations inherent in conventional shearing mechanisms, the speeds at which gobs are deliverable to molds by shearing are generally limited to a maximum of about 200 gobs per minute.

It is an object of the present invention to provide a method for loading charges of glass into molds at rates many times those obtainable by conventional gobbing and shearing methods.

A further object is the provision of such a method in which the amounts of glass supplied to molds can be simply and precisely regulated.

These and other objects, which will be apparent from the detailed description of the invention, are accomplished by feeding a continuous stream of low viscosity glass across the tops of a series of upwardly open molds in order to effect severance of the stream of glass into a plurality of charges by means of the rims of the molds under the influence of gravity. Inasmuch as the charges are formed by the respective mold rims, rather than by a single shearing device, such charges can be formed concurrently, at rates in excess of 1000 charges per minute and the charges will fall directly into the respective molds.

Figure 1:
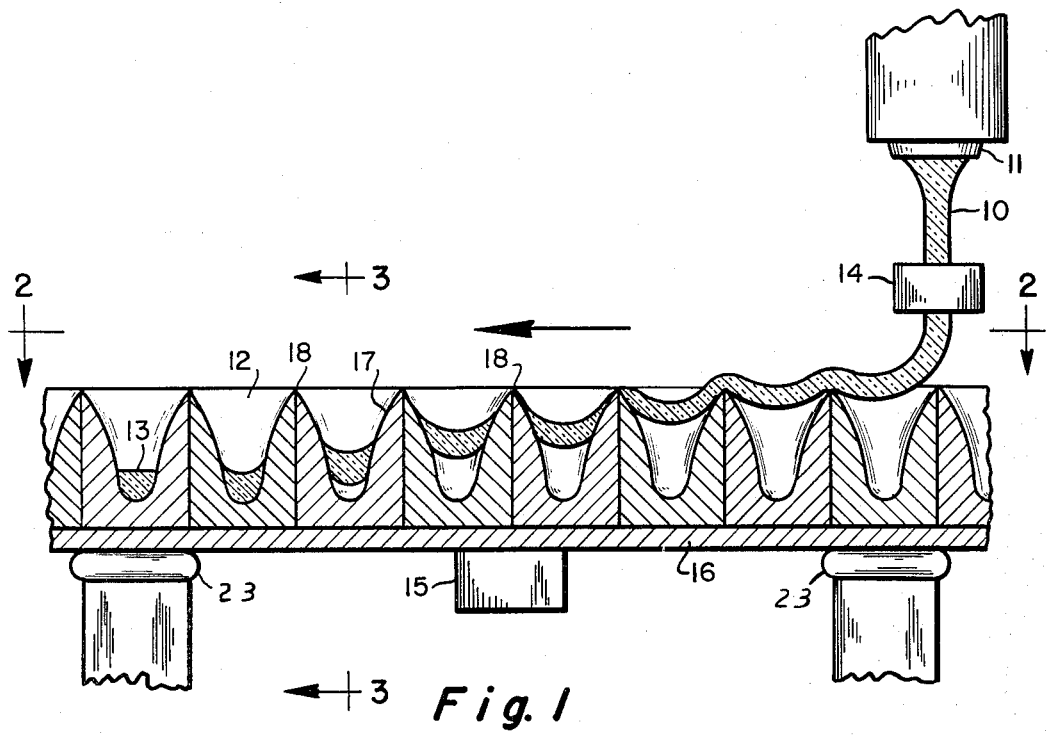
Figure 2:
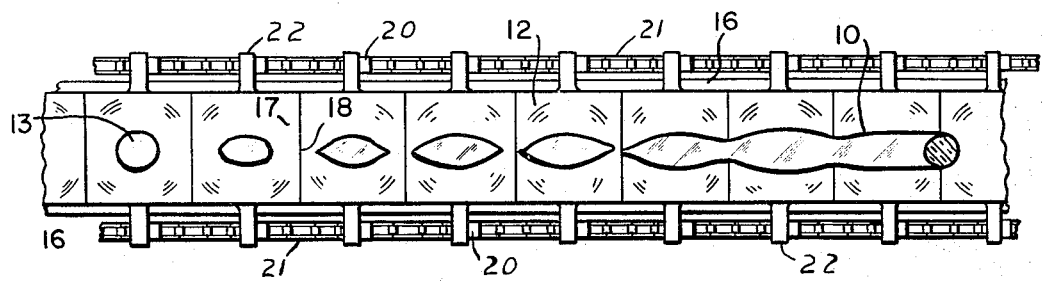
Figure 3:
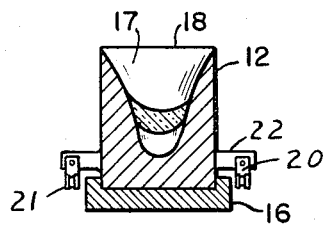

The invention will be described with reference to the accompanying drawing, in which:

FIGURE 1 is a side elevational view, partly in section, of apparatus for carrying out the method of the present invention, FIGURE 2 is a top plan view of part of the apparatus of FIGURE 1 taken on line 2—2 of FIGURE 1, and FIGURE 3 is a sectional view taken on line 3—3 of FIGURE 1.

Referring to the drawing, a continuous stream of molten glass 10 emerges from orifice 11 and falls downwardly under the influence of gravity to contact rims 18 of a plurality of upwardly concave open carbon molds 12 moving in succession along a generally horizontal path in the direction of the arrow in FIGURE 1. The molds are drawn across channeled table 16 by means of dogs 20 of chains 21, which are attached to mold ears 22. The glass stream is preferably at a viscosity substantially lower than that used in conventional shearing processes, preferably within the range 50–100 poises and, for maximum speed of forming, most advantageously within the narrower range 50–100 poises. The glass stream is intercepted by the rims of the molds as the molds travel in the direction indicated by the arrow, and the stream is drawn downwardly over the rims into the molds under the influence of gravity, separating into a plurality of charges 13 suitable for subsequent forming operations.

The sizes of the glass charges and the rate at which the charges are formed can be regulated by varying the speed at which the respective molds move under the orifice and/or by varying the rate of flow of stream 10.

The viscosity of the glass supplied to the molds can be determined by the temperature of the forehearth from which the stream emerges, or, alternatively, its temperature may be regulated by means of external heating means, such as burner 14, which directs heat radially toward stream 10, or by other suitable means for heating the stream subsequent to its emergence from the orifice.

The separation of stream 10 into charges 13 may be expedited by vibrating molds 12 by means of any conventional vibrator, such as vibrator 15, which effects vibration of table 16 across which the molds travel. Vibration of table 16 is permitted by conventional resilient vibrator mounts 23.

It is preferable that molds 12 be contiguous with one another and that their entire upper surfaces slope downwardly from rims 18 toward a central depression in order to cause all of the glass of the stream to flow into the mold cavities. Although the mold cavities are generally circular in horizontal cross-section, such shape is not essential. Charges 13 may be subsequently formed into finished articles within molds 12, or the charges may be transferred from the molds into other forming molds. Accordingly, the configurations of upper surfaces 17 of the molds may be designed either to facilitate the separation of the stream, with steeper surfaces effecting quicker separation, or the surfaces may be designed as those which will impart a desired shape to the final product. In general, all molds having cavities which open upwardly may be utilized in effecting glass separation according to the present process. It will be appreciated that narrow or sharp rims will expedite such separation.

Molds 12 preferably are made of carbon, since this material minimizes friction between the molds and the glass stream, thereby facilitating separation of the stream; however, other mold materials, such as stainless steel, may be used.

Although it is generally preferable to employ in the present process glasses at viscosities of less than 100 poises in order to permit rapid separation of the stream into charges, glasses may be utilized at other viscosities depending upon the configuration of the mold surfaces and the length of time permissible for separation of the stream into charges. In general, glasses at viscosities between 5 and 500 poises are satisfactory for the practice of the present method; however, depending upon the remaining parameters of the process, glasses outside this viscosity range may sometimes be employed. As previously mentioned, most efficient separation of the glass is effected when viscosities are within the range 50–100 poises. In addition, it will be appreciated that the present process may be carried out by means of apparatus differing from that illustrated and described as preferred means. Accordingly, it is intended that the scope of the present invention be limited only by the scope of the appended claims.

I claim:

1. The method of forming charges of molten glass which comprises depositing a stream of molten glass across a plurality of receptacles having rim portions defining edges of upwardly open cavities and maintaining said receptacles with said cavities oriented upwardly for a time sufficient to allow portions of said stream of glass to be drawn downwardly over said rim portions solely by gravity into said cavities and to be severed from said stream by said rim portions while contacting only said receptacles to form charges of molten glass in said cavities.

2. The method according to claim 1 in which the viscosity of said glass in said stream is within the range approximately 5–500 poises.

3. The method according to claim 1 in which the viscostiy of said glass in said stream is within the range approximately 50–100 poises.

4. The method according to claim 1 which includes the step of subsequently forming said charges into desired shapes in said cavities.

5. The method according to claim 1 which includes vibrating said receptacles in order to facilitate the separation of said charges from said stream.

6. The method of forming charges of molten glass which comprises producing a stream of molten glass, effecting relative motion between said stream and a plurality of upwardly open receptacles in order to feed said stream successively across rim portions defining cavities in said receptacles and to effect severance of said stream by said rim portions solely under the influence of gravity into a plurality of charges in said cavities.

7. The method according to claim 6 in which the viscosity of said glass is within the range approximately 50–100 poises.

8. The method of forming charges of molten glass which comprises producing a stream of molten glass moving along a first path, moving in succession along a second path generally transverse to said first path a plurality of receptacles having rim portions defining upwardly open cavities therein in order to intercept said stream with said receptacles, and maintaining said receptacles with said cavities oriented upardly for a time sufficient to allow portions of said stream to be severed from said stream by said rim portions under the influence of gravity and in the absence of mechanical contact with said glass other than contact between said glass and said receptacles and to fall into said cavities to form charges.

9. The method of forming charges of molten glass which comprises forming a stream of molten glass moving downwardly along a substantially vertical path, moving in succession across said substantially vertical path and along a generally horizontal path a plurality of receptacles having rim portions defining upwardly open cavities in order to intercept said stream with said receptacles, and maintaining said receptacles with said cavities oriented upwardly for times sufficient to allow portions of said stream to be drawn downwardly solely by gravity over said rim portions into said cavities to form charges of glass therein.

10. The method according to claim 9 in which the viscosity of said glass in said stream is within the range approximately 5–500 poises.

References Cited

UNITED STATES PATENTS

| | | | |
|---|---|---|---|
| 1,482,760 | 2/1924 | Milliken | 65—35 |
| 1,766,680 | 6/1930 | Parham | 65—184 XR |
| 2,286,323 | 6/1942 | Weber et al. | 65—184 XR |
| 2,538,589 | 1/1951 | Poje | 65—184 XR |

DONALL H. SYLVESTER, *Primary Examiner.*

R. L. LINDSAY, *Assistant Examiner.*